United States Patent [19]

Tullio

[11] 4,014,646
[45] Mar. 29, 1977

[54] HARD WATER-TOLERANT DYE SOLUTIONS

[75] Inventor: Victor Tullio, Wilmington, Del.

[73] Assignee: E. I. Du Pont de Nemours and Company, Wilmington, Del.

[22] Filed: Mar. 22, 1976

[21] Appl. No.: 669,470

Related U.S. Application Data

[63] Continuation-in-part of Ser. No. 473,662, May 28, 1974, abandoned.

[52] U.S. Cl. .................................. 8/39 R; 8/85 A; 8/88

[51] Int. Cl.$^2$ ..................... C09B 1/00; C09B 5/62; D06P 1/20

[58] Field of Search ............................ 8/39, 88, 85

[56] References Cited

UNITED STATES PATENTS

| | | | |
|---|---|---|---|
| 1,131,516 | 3/1915 | Herzberg et al. ................ | 260/374 |
| 2,314,356 | 3/1943 | Lee et al. ......................... | 260/371 |
| 2,992,064 | 7/1961 | Musser ............................. | 8/61 |

OTHER PUBLICATIONS

Summersgill, J. Soc. Dyers and Colourists, 1953, 70, 278–283.
"Keys to Chelation with Versene Chelation Agents", Dow Chemical Co. Bulletin.

Primary Examiner—Joseph L. Schofer
Attorney, Agent, or Firm—James A. Costello

[57] ABSTRACT

Improved concentrated dye solutions comprising anionic monosulfonated anthraquinone dye, the cations including alkanolammonium cations, in a mixed solvent of water and an inert organic cosolvent, the improvement comprising the addition thereto of about 0.03 to 0.20 part by weight, per part of dye of ethylenediaminetetraacetic acid, diethylenetriaminepentaacetic acid, or N-hydroxyethylethylenediaminetriacetic acid, said dye solution containing no more than about 0.2 percent, based on total solution weight, of cations other than alkanolammonium cations.

7 Claims, No Drawings

HARD WATER-TOLERANT DYE SOLUTIONS

CROSS-REFERENCE TO RELATED APPLICATION

This application is a continuation-in-part of my co-pending application bearing U.S. Ser. No. 473,662, filed on May 28, 1974, now abandoned.

BACKGROUND OF THE INVENTION

1. Field of the Invention

This invention concerns concentrated solutions of monosulfonated anthraquinone dyes which retain good solubility even when diluted with hard water. The parent application was examined in Group Art Unit 144.

2. Description of the Prior Art

Monosulfonated anthraquinone dyes generally are somewhat limited in solubility. With the advent of solution dyes for continuous dyeing processes, various methods have been disclosed for preparing 10% to 20% solutions of these dyes for use in said processes. In many cases, lithium and alkanolammonium salts of the dyes were found to be more soluble than sodium salts. In most cases, the aqueous solutions employ a supplementary water-miscible solvent of fairly low molecular weight.

A failing of solutions of monosulfonated anthraquinone dyes is a tendency to precipitate calcium or magnesium salt forms of the dyes when water containing these ions is added to the dye solutions. Another failing of these solutions is a tendency to precipitate the dye when pH of the solution is lowered to about 4.0 or below. This precipitation is particularly objectionable when the dye comes out of solution in a gel form which is very difficult to remove from transfer lines.

What is needed is a solution to the problem of anthraquinone dye gelation in order to eliminate plugging and contamination of transfer lines. The following courses of action which can be gleaned from the prior art are not satisfactory: (1) use of triethanolamine as a dye solubilizer, (2) use of the sodium salt of ethylenediaminetetraacetic acid (EDTA) as a chelating agent, (3) use of triethanolamine together with the commonly used sodium salt of ethylenediaminetetraacetic acid (EDTA).

Relevant prior art includes the following. The anthraquinone dyes, "Acid Blue 40", Colour Index No. 62125, and "Acid Blue 25", Colour Index No. 62055, are disclosed in U.S. Pat. No. 1,131,516.

U.S. Pat. No. 3,055,726 discloses the use of the sodium salt of ethylenediaminetetraacetic acid and a polymeric alkali metal phosphate in a dye bath containing hard water and sodium carbonate. Summersgill, Journal of the Society of Dyers and Colourists 70, 278-283 (1953), discloses that some recalcitrant wool dyes can be prevented from precipitating in hard water by adding ethylenediaminetetraacetic acid. The only specific dye mentioned in this article is a disulfonated azo dye.

The Dow Chemical Company's Versene literature recommends use of triethanolamine with the tetrasodium salt of ethylenediaminetetraacetic acid in systems containing ferric ion in alkaline systems. U.S. Pat. No. 2,992,064 discloses use of the triethanolamine salt of ethylenediaminetetraacetic acid to treat dyed fabrics for the purpose of inhibiting gas fading. U.S. Pat. Nos. 2,314,356 and 3,681,320 disclose alkanolammonium salts as offering improved dye solubilities.

SUMMARY OF THE INVENTION

This invention concerns improved concentrated dye solutions comprising about 10% to 20% by weight of a monosulfonated anionic anthraquinone dye, the cations including alkanolammonium cations, the dye being dissolved in a mixed solvent of water and an inert organic cosolvent, the improvement comprising the addition thereto of about 0.03 to 0.20 part by weight, per part of dye of ethylenediaminetetraacetic acid, diethylenetriaminepentaacetic acid, or N-hydroxyethylethylenediaminetriacetic acid, said dye solution containing no more than about 0.2 percent, based on total solution weight, of cations other than alkanolammonium cations.

The following dyes are preferred:

Acid Blue 40 (Colour Index No. 62125) which has the structure

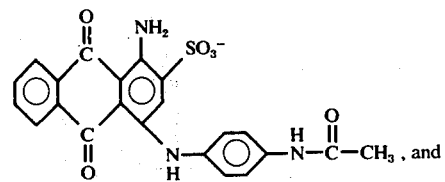

Acid Blue 25 (Colour Index No. 62055) which has the structure

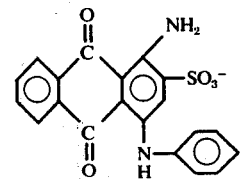

Both of these dyes can be prepared by methods well known in the art and can be isolated in their free acid form. They need not be dried but can be used in the form of a water-wet filter cake to prepare dye solutions.

If solutions of this invention contain more than about 5% of cations other than alkanolammonium cations (about 0.094% by weight of the solution) there is the dangers of solution instability. Such solution instability may lead to dye gelation. In any event, for best results the amount of cations other than alkanolammonium cations should not be allowed to exceed about 0.2% by weight of the entire solution. Objectionable cations include sodium, calcium and magnesium cations.

For certain uses at low pH, arylamine inhibitors can be added to the improved dye solutions of this invention for further protection against dye gelation. Useful inhibitors include p-aminobenzoic acid, aniline, oxydianiline, anthranilic acid, p-aminoacetanilide, and p-phenylenediamine. P-aminobenzoic acid is the preferred inhibitor. The amount of inhibitor that is employed is between 0.10 to 0.30 part by weight per part of dye.

DETAILS OF THE INVENTION

To form the solutions of this invention, the anthraquinone dyes are dissolved in solvents comprising at least 30% water, the remainder being a liquid, water-miscible hyroxy, keto or ether cosolvent of fairly low molecular weight, i.e., of up to about 200. From about 70% to 80% of the total composition weight is solvent. The solutions contain up to about 20% by weight of the dye itself, calculated as the free acid form.

In addition to about 30% to 45% water, the preferred solvents used are ethylene glycol and methyl carbitol. Other suitable supplementary solvents are Cellosolve or ethylene glycol dimethyl ether, glycerine, diethylene glycol dimethyl ether, N-methylpyrrolidone and the like. Mixtures of supplementary solvents can be used.

To prevent the precipitation of calcium or magnesium ions, EDTA is added to the solution in the amount of from 0.03 to 0.20 part per part of the dye. The sodium salt forms of ethylenediaminetetraacetic acid should not be used since they do not provide sufficiently stable solutions. Lithium cations are somewhat less objectionable than the sodium cations. In any event, all or nearly all of the cations in the solution should be alkanolammonium ions. Similar compounds having the same function as ethylenediaminetetraacetic acid are: diethylenetriaminepentaacetic acid and N-hydroxyethylethylenediaminetriacetic acid, and these are also useful in some cases.

The pH of the solution is kept in the range of $7 \pm 1.0$ by adding an alkanolamine giving alkanolammonium ions of the formula $[HNR^1R^2R^3]^+$ where $R^1$ and $R^2$ are $C_2$- or $C_3$- alkanol radicals and $R^3$ is H or a $C_2$- or $C_3$- alkanol radical. The preferred alkanolamine is triethanolamine. It is added in an amount sufficient to neutralize the sulfonic acid group of the dye and the carboxylic groups of the EDTA, giving a pH of about $7 \pm 1.0$. Improved solubility is sometimes seen when a different alkanolamine replaces part of the triethanolamine. Diethanolamine and diisopropanolamine are representative of such alternative alkanolamines. If another acid material is made a part of the dye solution, enough alkanolamine should be added to neutralize it also.

For space dyeing and in some printing processes, dye baths are adjusted to fairly low pH, circa 4.0 or lower. Some of the monosulfonated anthraquinone dyes tend to precipitate at such low pH in a very objectionable gel form. Dye solutions which are to be used in this fashion should contain an inhibitor as described above in the summary of the invention. Gelling tendency is easily observed by agitating a sample of dye solution, a thickener or gum, and adding formic acid to pH 2.0. Gel formation, when it occurs, is usually apparent.

The effectiveness of the present invention is measured by its success when hard water is used as the basis of the dye bath. Hard water contains calcium and/or magnesium ions in varying amounts. As a test standard, so-called Dalton hard water is employed. This is prepared to contain 85 parts per million of $CaCl_2$ and 15 parts per million of $MgSO_4$. The name is derived from Dalton, Georgia, a city which is a center of the carpet industry in the United States.

To test the characteristics of dye solutions, 1 part of the dye solution can be added to 99 parts of Dalton hard water and the mixture stirred for about ½ hour or longer at ambient temperature. The solution should remain clear, with no precipitate. The precipitate, which is the calcium or magnesium salt of the dye may, however, appear in a light, flocculent form difficult to see, so a further test is performed. The 100 ml of solution is filtered under 24 inches of Hg vacuum through a No. 5 Whatman filter paper, and the time of filtration observed. A satisfactory solution is indicated by a short filtration time, less than about 1 minute and a lack of precipitate on the filter paper. Longer times indicate presence of an objectionable precipitate. The solutions of the invention meet this test while, as noted, solutions not containing EDTA do not.

The dye solutions of the invention can be readily prepared in the following manner:

The mixed solvent is first prepared by mixing the components, and the dye is added. If the dye is added as a water-wet filter cake, care must be taken to allow for the water present in the cake. Sodium chloride content of the dye in either dry or wet form should be less than 1%. After thorough mixing, the alkanolamine is added, followed by the EDTA. The pH is adjusted by adding triethanolamine, and, after stirring for ½ hour, pH is determined again and readjusted if necessary. The charge is heated to about 80° to 90° C for several hours, then cooled to room temperature. It is then standardized to the required strength by adding more of the supplementary solvent as necessary to meet the strength of the selected standard.

When the charge includes an amino compound as gel inhibitor, the amino compound is added just before the first pH adjustment with triethanolamine.

The dye solutions of this invention are employed in dyeing in exactly the same manner as are known dye solutions.

The following Examples illustrate the invention. In these Examples, temperatures are in degrees centigrade and parts and percentages are by weight, as throughout the specification, unless otherwise noted.

EXAMPLE 1

A. Dye is prepared by condensing 1-amino-4-bromo-2-anthraquinone-sulfonic acid (sodium salt) with aniline in aqueous medium at about 95° in the presence of cuprous chloride and sodium bicarbonate. The crude dye is precipitated in sodium salt form by adding salt and is isolated by filtration, then washed with weak salt solution. The free acid form of the dye is then prepared by heating the filter cake in an aqueous mixture containing 10% HCl, 10% 2-ethoxyethanol and 80% water. After cooling, the solid dye in free acid form is isolated by filtration and washed with 0.5% hydrochloric acid. After blowing as much free liquid as possible out of the cake, it is ready to use for preparation of the dye solution.

B. Into a suitable vessel were charged 38.1 parts of water, 17.0 parts of methyl carbitol and 7.6 parts of triethanolamine. After thorough mixing, 15.5 parts of the dye

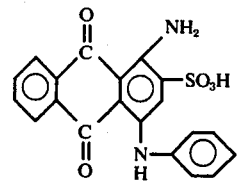

in the form of water-wet filter cake, prepared as in A, was mixed in, then 1.0 part of EDTA and 4.0 parts of p-aminobenzoic acid were added and mixed thoroughly. The pH of the mixture was low, so another 7.6 parts of triethanolamine was added gradually to adjust the pH to 6.5. The charge was heated to 80° to 90° and held for two hours, then cooled to 25° to 30°.

Strength of the dye solution was adjusted to standard by adding 9.2 parts of a 2/1 water/methyl carbitol solution. Comparison of the solution with the standard was made spectrophotometrically.

Samples of the prepared solution showed no precipitate and the solution could be filtered within 30 seconds when tested in Dalton hard water as already described herein.

When the pH of a sample was adjusted to 2.0 by adding formic acid in the presence of a gum thickener, the solution remained clear and showed no sign of gel or precipitate.

C. The dye solution of this Example is particularly useful for dyeing nylon fibers. In this Example, the nylon substrate was BCF carpeting, made by tufting nylon yarn onto a nonwoven polypropylene backing. The BCF nylon yarn was 3700-denier, 204-continuous filaments, trilobal, jet-bulked yarn, melt-spun from poly(hexamethylene adipamide) flake.

Thirty parts of the carpeting were scoured for 20-30 minutes at 82° in 1000 parts of water containing:

| | |
|---|---|
| the condensation product of 20 moles of ethylene oxide with 1 mole of $C_{18}$ alcohol | 0.2 part |
| concentrated ammonium hydroxide | 0.6 part |
| sodium hydroxide | 0.15 part |
| The carpeting was rinsed thoroughly in water. The carpeting was then added to a dyebath consisting of 1000 parts of water containing: | |
| dodecyldiphenyl ether disulfonic acid, disodium salt | 0.85 part |
| 100% dye (in the form of 15% active ingredient solution) | 0.03 part |
| the condensation product of 10 moles of ethylene oxide with 1 mole of $C_{18}$ alcohol | 0.5 part |
| monosodium phosphate | 0.6 part |

The pH was adjusted to 6.0 by adding acetic acid or disodium phosphate, as necessary.

The dyebath temperature was raised to 99° over 45 minutes and the dyeing continued for 1 hour. The bath was then dropped and the carpeting given a warm water rinse.

A level, reddish blue shade of good value was obtained. The lightfastness of the dyeing was excellent.

EXAMPLE 2

A. Dye is prepared by condensing 1-amino-4-bromo-2-anthraquinone-sulfonic acid with p-amino-acetanilide in an aqueous medium at about 90° in the presence of cupric sulfate, sodium bisulfite and sodium bicarbonate. The slurry is filtered at 90°, the dye remaining in solution. The sodium salt form of the dye is then precipitated by adding salt and cooling to about 40°, and is isolated by filtration. The filter cake is heated to 95° to 100° in 1% hydrochloric acid and is then cooled. The free acid form of the dye is isolated by filtration, and the mother liquor blown out of the cake as completely as possible. The filter cake is then ready to use for preparation of the dye solution.

B. Into a suitable vessel were charged 20.0 parts of ethylene glycol and 29.3 parts of water. After mixing thoroughly, 15.8 parts of the dye

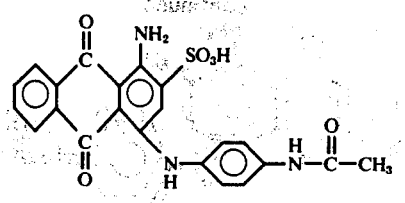

in the form of water-wet filter cake, prepared as in A, was added and mixed thoroughly with the solvent, forming a thin slurry. There were then added 1.55 parts of diisopropanolamine, 1.22 parts of diethanolamine, 1.73 parts of triethanolamine, and 2.0 parts of ethylenediaminetetraacetic acid (free acid). After mixing, the pH was too low, and 4.37 parts of additional triethanolamine was added to bring the pH to 6.5. The solution was heated to 80° to 90° and held at that temperature for two hours, then cooled to 25° to 30°.

Another 7.6 parts of 1/1 ethylene glycol-water solution was added to adjust the strength of the charge to standard.

Samples of the solution showed no precipitate, and filtered in 45 seconds when tested in Dalton hard water.

Control

A. In another preparation, the procedure of part B of Example 1 was followed except that neither EDTA nor p-aminobenzoic acid was used. The clear liquid product when tested in Dalton hard water took 5 minutes and 4 seconds to filter and contained a significant amount of precipitated solid which was collected on the filter. It was thus unsatisfactory.

B. When the clear liquid of A was treated with 1 part per 100 parts of the sodium salt of ethylenediaminetetraacetic acid, a precipitate formed. When the same liquid dye was treated with 1 part of ethylenediaminetetraacetic acid and 3 parts of triethanolamine per 100 parts, the solution remained clear.

The embodiments of the invention in which an exclusive property or privilege is claimed are defined as follows:

1. In a dye solution comprising about 10% to 20% by weight of anionic monosulfonated anthraquinone dye, the cations including alkanolammonium cations, the dye being dissolved in a mixed solvent of water and an inert organic cosolvent, the improvement comprising the addition thereto of about 0.03 to 0.20 part by weight, per part of dye, of ethylenediaminetetraacetic acid, diethylenetriaminepentaacetic acid, or N-hydroxyethylethylenediaminetriacetic acid, said dye solution containing no more than about 0.2 percent, based on total weight of the dye solution, of cations other than alkanolammonium cations, the anthraquinone dye being selected from at least one member of the group

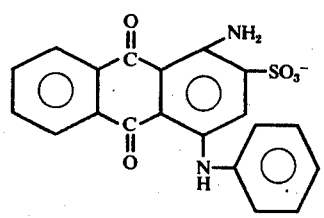

and

-continued

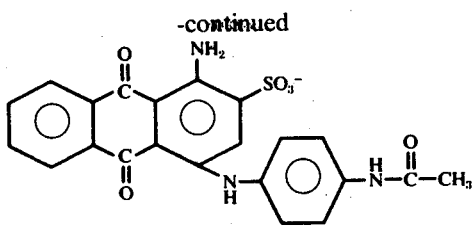

2. A dye solution according to claim 1 wherein the dye is

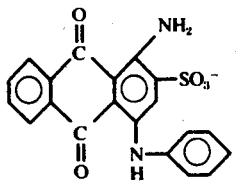

3. A dye solution according to claim 1 wherein the dye is

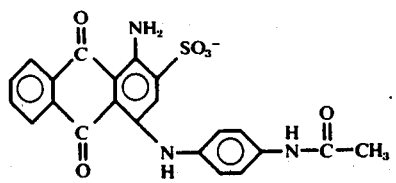

4. A dye solution according to claim 1 containing additionally about 0.10 to 0.30 part by weight, per part of dye, of an amine compound selected from at least one member of the group aniline, p-aminobenzoic acid, oxydianiline, anthranilic acid, p-phenylenediamine, and p-aminoacetanilide.

5. A dye solution according to claim 4 wherein the dye is selected from at least one member of the group

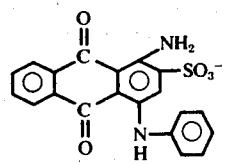

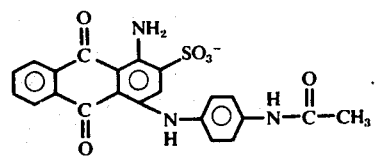

6. A dye solution according to claim 5 wherein the dye is

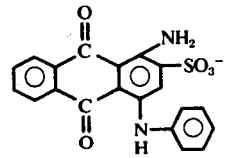

7. A dye solution according to claim 5 wherein the dye is

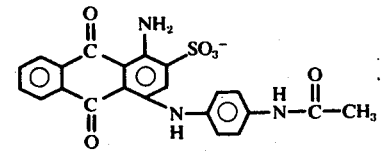

* * * * *